Feb. 6, 1968  F. G. BONFILS  3,367,177
TORQUE MEASURING DEVICE FOR MISSILE CONTROL SHAFTS
Filed Nov. 19, 1965  2 Sheets-Sheet 1

INVENTOR
FREDERICK G. BONFILS

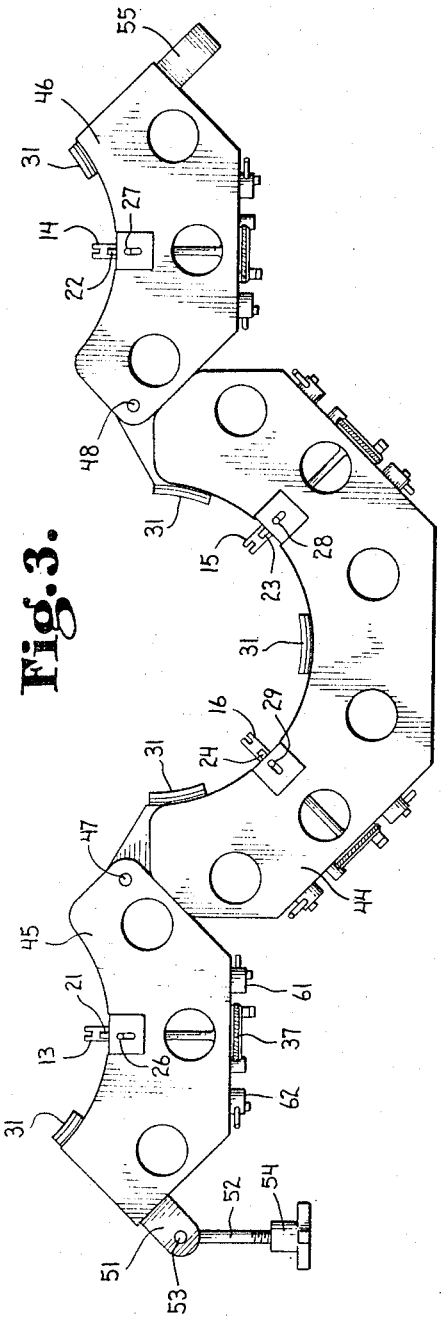
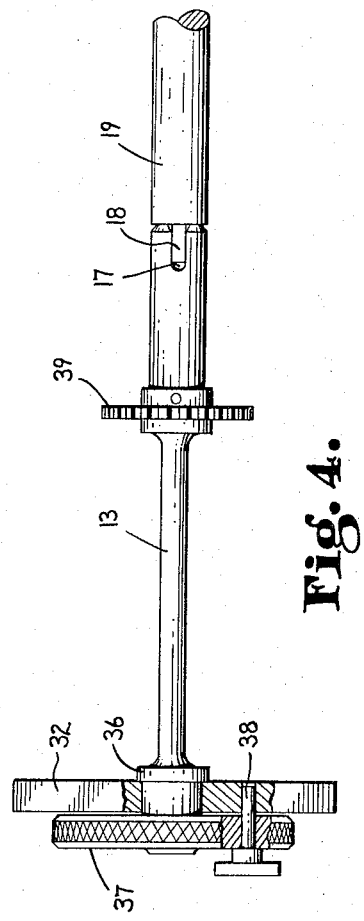

United States Patent Office 3,367,177
Patented Feb. 6, 1968

3,367,177
TORQUE MEASURING DEVICE FOR MISSILE
CONTROL SHAFTS
Frederick G. Bonfils, Indianapolis, Ind., assignor to the United States of America as represented by the Secretary of the Navy
Filed Nov. 19, 1965, Ser. No. 508,870
6 Claims. (Cl. 73—134)

The invention described herein may be manufactured and used by or for the Government of the United States of America for governmental purposes without the payment of any royalties thereon or therefor.

The present invention relates to a torque measuring device, and more particularly to a device for measuring the torque output of rotatable shafts in missile weapons.

It is common practice to employ control surfaces, such as fins, on missiles to control or correct the direction of travel of a missile after launch. Frequently, four control surfaces are used on missiles, and these are controlled either individually or in pairs to provide guidance in both azimuth and elevation. The control surfaces used on missiles are normally attached to rotatable shafts that are connected through a mechanical linkage to an actuator, which in turn, is regulated by a controller. For proper operation of the missile guidance system, it is necessary that the torque output of the control surface shafts be within a predetermined range. After final assembly of the missile, it is often desirable to check the torque output of the control surface shafts in order to determine that the mechanical linkage of the guidance system has been properly assembled and is in proper operating condition.

The present invention provides a simple and practicable device for efficiently determining the output torque of a plurality of control surface shafts. A supporting frame, which is hinged in two places in order to facilitate attachment, is positioned around a missile to be tested. A plurality of torque bars are attached to the supporting frame, there being a separate torque bar for each control surface shaft to be checked. One end of each torque bar is constrained and the opposite end is provided with a slot that engages a control surface shaft. A gear is provided on each torque bar and this gear meshes with a pinion gear on a shaft of a servo transmitter. As a torque bar is deflected, the amount of deflection is sensed, through the gear train, by the servo transmitter thereby converting the deflection into an electrical signal that is proportional to the amount of deflection of the torque bar. An appropriate read out system can be connected to the output of the servo transmitter so that the torque value can be read directly.

It is therefore a general object of the present invention to provide an improved torque measuring device for measuring the torque of a plurality of rotatable shafts.

Other objects and advantages of the present invention will be readily appreciated as the same becomes better understood by reference to the following detailed description when considered in connection with the accompanying drawings wherein:

FIGURE 3 is a front view of a preferred embodiment in an opened position; and

FIGURE 4 is a partial side view showing the engagement of a torque bar with a control surface shaft.

Figures 1, 2:
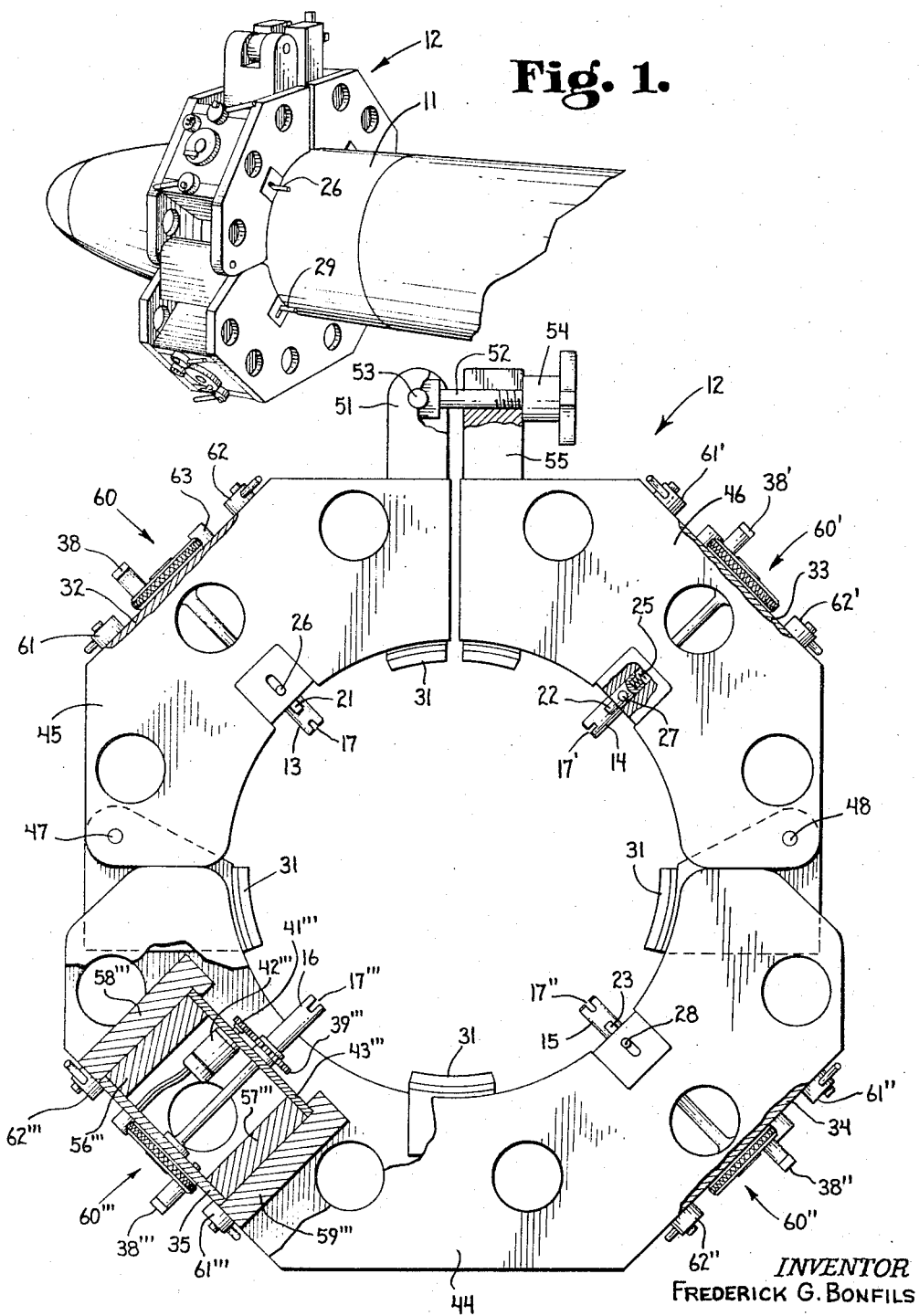
FIGURE 1 is a perspective view showing a preferred embodiment of the invention mounted on a missile.
FIGURE 2 is a front view, partially broken away, of a preferred embodiment in a closed position.

Referring now to the drawings, in FIGURE 1 there is illustrated a missile 11 that has a torque measuring device 12 mounted thereon. Missile 11 normally has four control surfaces, such as fins, that have been removed in order to mount the torque measuring device 12. Four torque bars 13, 14, 15, and 16 are provided and the end of each bar is provided with a slot 17 that engages with a tang 18 on control surface shaft 19, as shown in FIGURE 4 of the drawings. The end configuration of the torque bars is determined by the manner that the control surfaces are attached to their respective shafts. For example, if the control surfaces are threadedly attached to the control surface shafts, then the torque bars, likewise, would be threadedly attachable to the control surface shafts. In order to insure that torque bars 13, 14, 15, and 16, are properly aligned, four indexing pins 21, 22, 23, and 24 are provided on device 12 and these indexing pins are engageable with holes in the skin of missile 11. A spring 25 is provided for each indexing pin and these springs bias indexing pins outwardly in order to insure positive engagement with the holes in the skin of missile 11. The indexing pins not only insure proper alignment of the torque bars with the control surface shafts but also positively lock device 12 to missile 11. Handles 26, 27, 28, and 29 are threadedly attached to pins 21, 22, 23, and 24, respectively, to assist in retracting the indexing pins. A plurality of resilient pads 31 are fastened to the inner diameter of device 12 for cushioning so that the device will not damage the skin of missile 11.

Torque bars 13, 14, 15, and 16, each have one end rotatably connected to mounting plates 32, 33, 34, and 35, respectively. As best shown, in FIGURE 4 of the drawings, a shoulder 36 is provided on each torque bar, and a locking plate 37 is secured, as by welding, to the outer end of each torque bar. Each mounting plate and each locking plate are bored and a locking pin 38 is provided through these holes to stationarily lock the locking plates to its respective mounting plate. A spur gear 39 is attached to each torque bar and each spur gear 39 meshes with a pinion gear 41 that is attached to a servo transmitter 42 that is mounted on plate 43.

As best shown in FIGURES 2 and 3 of the drawings, torque measuring device 12 has a bottom frame portion 44 and two top frame portions 45 and 46. Top frame portions 45 and 46 are pivotally connected to bottom frame portion 44 by hinge pins 47 and 48, respectively. A U-shaped bracket 51 is attached to top frame 45 and a locking bolt 52 is pivotally attached to bracket 51 by pin 53. A hand nut 54 is threadedly attached to bolt 52. A latch 55 is attached to top frame portion 46, and locking bolt 52 engages latch 55. When hand nut 54 is tightened against latch 55, the two upper frame portions are drawn together and locked.

Mounting plates 32, 33, 34, and 35 are each connected to a pair of side plates 56 and 57 and, likewise, the plates 43 on which the servo transmitters are mounted are attached to side plates 56 and 57 thereby providing a unitary assembly 60 that slidably engages into the frame. As shown in FIGURE 2 of the drawings, a pair of L-shaped brackets 58 and 59 are provided for each unitary assembly, and each unitary assembly 60 slidably fits into the frame assembly whereupon plates 43 bottoms against the L-shaped brackets. A pair of eccentric locks 61 and 62 are provided for each unitary assembly to lock the respective assemblies in the frame. A connector 63 is also provided on each mounting plate and electrical leads from the servo transmitters are connected to their respective connectors.

In operation, frame portions 45 and 46 are first opened, as shown in FIGURE 3 of the drawings, and the unitary assemblies are either removed or retracted so that the torque bars do not extend beyond resilient pads 31. Frame portion 44 is engaged with missile 11, then frame portions 45 and 46 are closed and locked by engaging bolt 52 in latch 55 and then tightening hand nut 54. Pins 21, 22, 23, and 24 are then engaged with holes in the skin of missile 11 thereby indexing the torque measuring device 12 and locking it in position. The unitary assemblies 60 are then slid into position, however, locking pins 38 have not, as yet, been inserted and thus locking plates 37 can be rotated thereby rotating the torque bars so that slots 17 can be aligned to engage tangs 18 in control surface shafts 19. After slot 17 has engaged its mating tang 18, locking plate 37 is rotated until locking pin 38 can be inserted thereby locking plates 32 and 37 together. As the torque bars are each secured, as by welding, to a locking plate 37, any rotation of control surface shaft 19 will cause the connected torque bar to twist and this twisting will cause gear 39 to turn, which then drives pinion gear 41 on servo transmitter 42. It can thus be seen that the mechanical rotation of the torque bars can be changed into electrical signals which can be applied to an appropriate read out system.

Obviously many modifications and variations of the present invention are possible in the light of the above teachings. It is therefore to be understood, that within the scope of the appended claims, the invention may be practiced otherwise than as specifically described.

What is claimed is:

1. A torque measuring device for rotatable control surface shafts of a missile comprising:
    a frame adaptable for fitting around the outer periphery of a missile,
    a plurality of torque bars each having one end attached to said frame and each having the other end engageable with separate control surface shafts of said missile,
    a plurality of gears attached one each to each said torque bar adjacent said end engageable with said control surface shafts,
    a plurality of rotation responsive means equal in number to the number of said torque bars, said means each having an input shaft and being attached to said frame, and
    a plurality of pinion gears attached one each to each said input shaft and engageable one each with each gear attached to each said torque bar.

2. A torque measuring device for rotatable control surface shafts of a missile as set forth in claim 1 wherein said rotation responsive means are servo transmitters.

3. A torque measuring device for rotatable control surface shafts of a missile as set forth in claim 1 wherein said frame is comprised of a lower portion and first and second upper portions, said first and second upper portions being pivotally connected to said lower portion.

4. A torque measuring device for rotatable control surface shafts of a missile as set forth in claim 3 wherein means are provided for locking said first and second upper portions together.

5. A torque measuring device for rotatable control surface shafts of a missile as set forth in claim 4 wherein said torque bars and said servo transmitters are slidably attached to said frame.

6. A torque measuring device as set forth in claim 5 having means for locking said torque bars and said servo transmitters to said frame.

No references cited.

RICHARD C. QUEISSER, *Primary Examiner.*

C. A. RUEHL, *Assistant Examiner.*